P. C. HEWITT.
VAPOR ELECTRIC APPARATUS.
APPLICATION FILED JAN. 4, 1912.
1,110,558.
Patented Sept. 15, 1914.
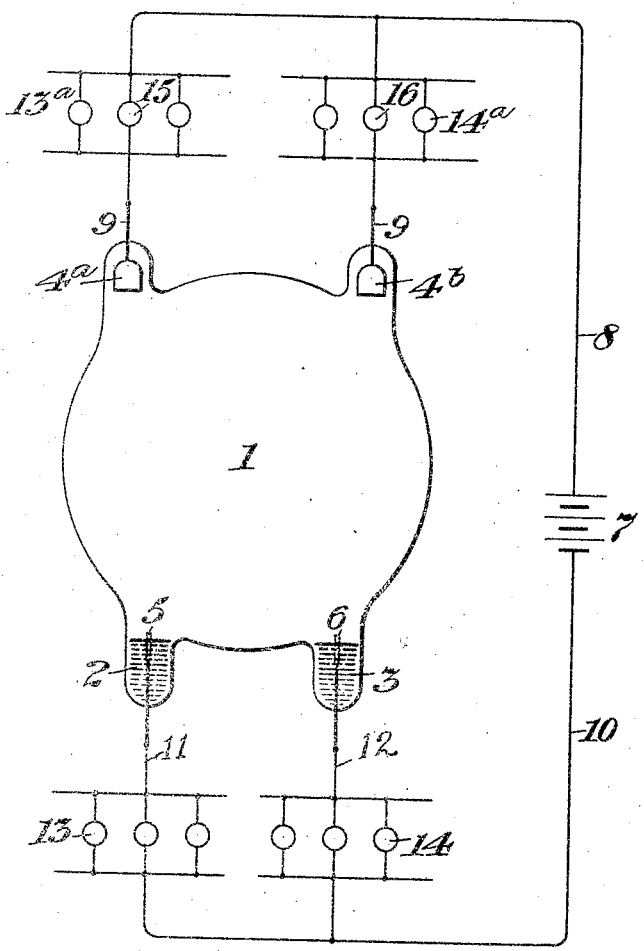

UNITED STATES PATENT OFFICE.

PETER COOPER HEWITT, OF RINGWOOD MANOR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

VAPOR ELECTRIC APPARATUS.

1,110,558.     Specification of Letters Patent.     Patented Sept. 15, 1914.

Original application filed May 13, 1904, Serial No. 207,757. Divided and this application filed January 4, 1912. Serial No. 669,342.

*To all whom it may concern:*

Be it known that I, PETER COOPER HEWITT, a citizen of the United States, and resident of Ringwood Manor, county of Passaic, State of New Jersey, have invented certain new and useful Improvements in Vapor Electric Apparatus, of which the following is a specification.

In United States Patent No. 1,069,695, issued August 12th, 1913, I have shown, described and claimed a vapor electric apparatus having a plurality of negative electrodes and a common positive electrode in combination with work circuits connected to one or more of the negative electrodes. In the same application I also show and describe a vapor electric apparatus having a plurality of positive electrodes and work circuits connected therewith. The present application relates more particularly to the latter form or embodiment of my invention.

The invention is illustrated in the drawing which is a diagram of a vapor electric rectifier apparatus in combination with circuits in which such a rectifier may be made useful.

Referring to the drawing, I show a rectifier, 1, containing two positive electrodes 4ª and 4ᵇ and two negative electrodes numbered 2 and 3. Work circuits 13ª and 14ª may be connected up in the circuits of the positive electrodes 4ª and 4ᵇ, as shown in the drawing. An apparatus of this sort is found to be operative and useful for systems of distribution such as those illustrated, and it has the advantage of furnishing a single rectifier apparatus in place of a plurality of such devices.

The electrodes 4ª and 4ᵇ may be of iron, graphite, or other suitable material, and the electrodes 2 and 3 may be of any volatilizable conducting liquid suitable to the purposes of this invention. Platinum points 5 and 6 are shown projecting above the surface of the electrodes 2 and 3 respectively, the same being typical of devices which may be used in connection with mercury or other electrodes for forming an upward meniscus whereby the entrance of the current into the negative electrodes is facilitated, localized, and regulated.

A conductor 8 leading from a suitable electric generator 7, is connected by lead wires 9, 9, with the positive electrodes 4ª and 4ᵇ through work circuits 13ª and 14ª. From the other side of the rectifier extend lead wires, 11 and 12, to a return conductor, 10, leading to the generator. The work circuits may contain translating devices, 15, 15, and 16, 16, of any suitable character.

Many uses for the rectifying apparatus might be devised and the present invention relates to only one of a variety of applications which could be made of the broad principle of the invention. As already stated, the utilization of the apparatus as a lamp instead of a rectifier is not excluded from the scope of this invention.

I claim as my invention:

1. A vapor electric apparatus having a plurality of positive electrodes, and a negative electrode, in combination with a separate work circuit connected with each positive electrode.

2. A vapor electric apparatus having a plurality of positive electrodes, and a negative electrode, in combination with a generator supplying current to the apparatus, one pole of such generator being connected to the negative electrode and the other pole thereof being connected in multiple to several positive electrodes.

3. A vapor electric apparatus having a plurality of positive electrodes, and a negative electrode, in combination with a generator supplying current to the apparatus, one pole of such generator being connected to the negative electrode and the other pole thereof being connected in multiple to several positive electrodes through separate work circuits.

Signed at New York in the county of New York and State of New York this 29th day of December A. D. 1911.

PETER COOPER HEWITT.

Witnesses:
    F. E. BARNES,
    R. A. HEWITT.